United States Patent [19]

Flannelly

[11] 3,829,052

[45] Aug. 13, 1974

[54] VIBRATION ISOLATOR

[75] Inventor: William G. Flannelly, South Windsor, Conn.

[73] Assignee: Kaman Aerospace Corporation, Bloomfield, Conn.

[22] Filed: May 1, 1972

[21] Appl. No.: 249,131

[52] U.S. Cl. .................................. 248/317, 248/358

[51] Int. Cl. .............................................. F16f 15/06

[58] Field of Search ....... 248/15, 18, 317, 329, 330, 248/331, 334, 358 AA

[56] References Cited

UNITED STATES PATENTS

| | | | |
|---|---|---|---|
| 415,896 | 11/1889 | Bradner | 248/329 |
| 2,494,445 | 1/1950 | Moeller | 248/18 X |

FOREIGN PATENTS OR APPLICATIONS

| | | | |
|---|---|---|---|
| 23,063 | 11/1901 | Great Britain | 248/330 |
| 1,167 | 1/1900 | Great Britain | 248/329 |

*Primary Examiner*—William H. Schultz
*Attorney, Agent, or Firm*—McCormick, Paulding & Huber

[57] ABSTRACT

A vibration isolator for reducing the transmission of vibrations between a supporting body and a body suspended from the supporting body employs suspension cables which are wrapped around a rotatable inertial mass in such a manner that the rotations of the mass will reel in one of the cables while other of the cables are paid out. The cables are connected to cylindrical surfaces of different diameters so that loads transmitted from one of the cables through the rotatable mass to the other cables generate a torque which causes the mass to rotate. A resilient tether connected to the mass urges the mass to rotate toward a static position in which the torque applied to the mass by the tether is balanced by the torque generated by the cables. In the presence of vibratory loads, the tether allows the rotatable mass to oscillate about the static position. By appropriate tuning of the mass and the resilient tether, it is possible to generate an antiresonance condition in which the vibrator isolator exhibits a zero impedance or transmissibility characteristic for vibratory loads of a given frequency.

15 Claims, 7 Drawing Figures

VIBRATION ISOLATOR

BACKGROUND OF THE INVENTION

The present invention relates to tuned vibration isolators which exhibit antiresonance characteristics. More particularly, the present invention resides in vibration isolator having a rotatable mass and spring combination incorporated with tension or suspension cables interconnecting two bodies which are to be vibrationally isolated from one another.

U.S. Pat. No. 3,322,379 entitled "Dynamic Antiresonant Vibration Isolator" issued May 30, 1967 to the inventor of the present invention discloses a device which interconnects two bodies and exhibits antiresonant characteristics such that vibrations of a given frequency generated in one of the bodies are prevented from being transmitted to the other body. The transmissibility characteristics of this type of isolator are said to be of zero or low impedance because the device prevents or substantially reduces the level at which vibrations are transmitted between the two bodies. Where there is no damping associated with the isolator, the impedance is zero at the given frequency and all vibratory forces at the given frequency are prevented from passing between the two bodies.

One area in which low impedance couplers are particularly desirable is in the aircraft field. It is quite common to employ helicopters in both military and nonmilitary applications for carrying large bulky items rapidly and conveniently from one location to another. The stability problems associated with a suspended load, the load slings and the aircraft must be thoroughly considered beforehand because of the catastrophic consequences which can occur if the suspended load becomes unmanageable in flight. In so far as vertical bounce is concerned, the critical excitation frequencies at which isolation is desired originate in the rotor system of the helicopter and are generally in the range of from 2 to 6 cycles per second depending upon the size of the rotor, the number of blades and other factors.

Active isolators for reducing the vertical coupling between the external cargo system and the helicopter have been tested. Experience with such isolators, however, indicates that they are complicated, sometimes unreliable and potentially dangerous. The greatest danger involved with active isolators is not the fact that they may be rendered inoperable but that partial damage to the feedback mechanism can result in a phase reversal which causes the interconnected cargo load and helicopter system to become instable.

A passive isolator for eliminating vertical bounce between the suspended cargo load and the helicopter is particularly attractive in view of the number of advantages it offers. A completely passive vibration isolator is self-contained and required no power input or feedback devices. Such an isolator may be lightweight, small in size and effective regardless of the cargo weight, the helicopter weight and the stiffness and damping associated with the slings which support the cargo from the helicopter. Aside from the operational aspects of the isolator, it is also desirable that the structure be a low maintenance item which can be achieved by eliminating bearings, pivots, linkages and other transmission mechanisms in which sliding and pivoting wear necessitate periodic lubrication or other maintenance. Also, if fluid elements can be eliminated in preference to massspring elements, periodic fluid replenishment or recharging operations are avoided. It is also possible with passive isolators incorporating a mass-spring system without viscous damping to neither consume nor dissipate energy and, as a consequence, neither power sources nor heat sinks are necessitated for prolonged operation of the isolator.

It is, accordingly, a general object of the present invention to disclose an antiresonant vibration isolator possessing the above-mentioned, desirable characteristics making it suitable for use as a coupler between a helicopter and a suspended load.

SUMMARY OF THE INVENTION

The present invention resides in a vibration isolator for reducing the transmission of vibrations at a given frequency between a first body in which an exciting force may exist and a second body coupled to the first by the isolator. The isolator comprises an inertial mass bearing at least two cylindrical surfaces positioned coaxially about an axis of the mass and having different radii of curvature. First coupling means is provided to connect the vibration isolator to the first body and second coupling means is provided to connect the isolator to the second body. First cable means, which may take the form of one or more parallel cables or straps, connects at one end to the first coupling means, and at the other end is wound at least partially around one of the two cylindrical surfaces of the inertial mass and is connected to the mass so that rotation of the mass about its axis causes the mass to roll along the first cable means relative to the first coupling means. Second cable means, which may also take the form of one or more cables or straps, connects at one end to the second coupling means. At the other end the second cable means is wound at least partially around the other of the two cylindrical surfaces on the inertial mass and is connected to the mass so that rotation of the mass about its axis causes the mass to roll along the second cable means relative to the second coupling means. Resilient means is connected to the inertial mass for urging it to roll along the two cabling means toward a given static position determined by a static load transmitted by the cabling means between the first and second coupling means.

By wrapping the respective cable means about the inertial mass on surfaces having a different radii, loads transmitted from one cable means through the mass to the other cable means generate torques on the mass and, in the case of vibratory loads, generate vibratory torques which cause the mass to roll back and forth about the static position. By appropriate design of the inertial mass and the resilient means, the isolator can be tuned to exhibit zero impedance characteristics for vibrations of a given frequency so that forces at the given frequency are not transmitted through the isolator. The operating characteristics of the isolator are independent of the dynamic characteristics of the interconnected bodies.

DESCRIPTION OF THE PREFERRED EMBODIMENTS

Figure 1:
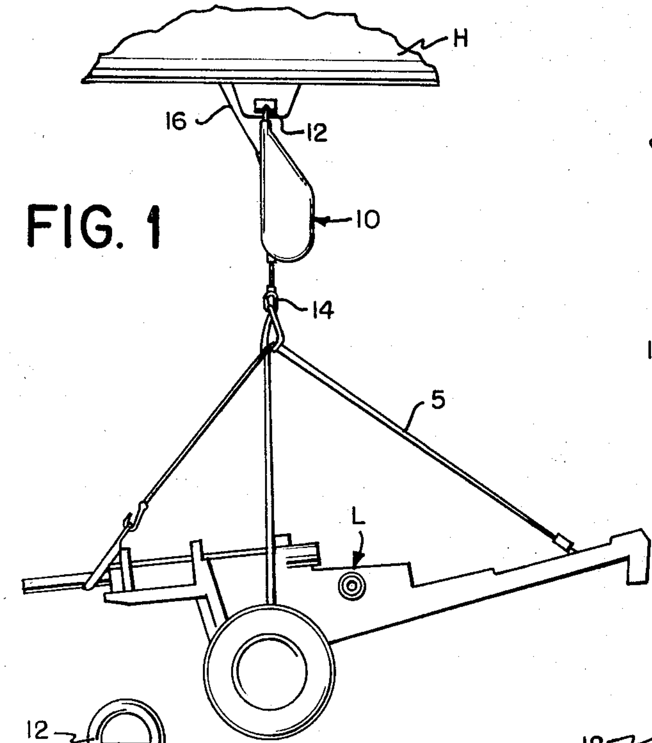
FIG. 1 shows the vibration isolator of the present invention as it would be used in suspending a cargo load from a helicopter.

FIG. 1 shows a vibration isolator, generally designated 10, constructed in accordance with the present invention and installed in an environment where it has particular utility, although it can be employed equally as well in numerous other environments where isolation is desired. The isolator 10 is shown as the coupling between the fuselage of a helicopter H and a suspended cargo load L in the form of a howitzer held in a lifting sling S. The isolator 10 has particular utility in the illustrated environment in view of its capacity to prevent the transmission of vertical excitation forces between the helicopter H and the suspended cargo L. Most frequently a helicopter will generate the vertical excitation forces at frequencies directly proportional to the rotor speed. These excitation frequencies characteristically lie in the range of from 2 to 6 cps and within this range pose a considerable threat to the interconnected helicopter and cargo load system. An instable condition in flight can produce catastrophic results and may require that the suspended cargo load be sacrificed by releasing it in order to save the helicopter and crew. It is, accordingly, highly desirable to utilize a vibration isolator of the type disclosed, which is substantially maintenance free and completely self-contained, to provide the necessary isolation between the aircraft and suspended load. The isolator of the present invention can be used either singly as illustrated in FIG. 1 or in parallel groupings.

Figure 2:
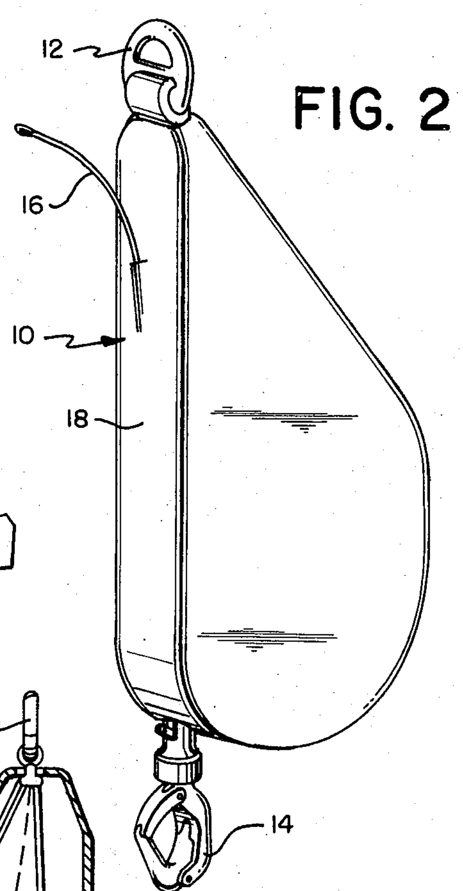
FIG. 2 is a perspective view showing the external casing of the vibration isolator shown in FIG. 1.

FIG. 2 shows the external features of the vibration isolator in one embodiment. A D-ring 12 is utilized to couple the isolator to the anchor point on the helicopter. A releasable cargo hook 14 at the bottom side is used to couple the isolator with the cargo load either directly or more commonly by means of a lifting sling such as that shown in FIG. 1. The cargo hook 14 can be opened from a remote station within the helicopter by means of the trip cable 16. The operating components of the isolator 10 are completely enclosed within an external shell or casing 18 to protect them from weather, dirt and damage.

Figure 3:
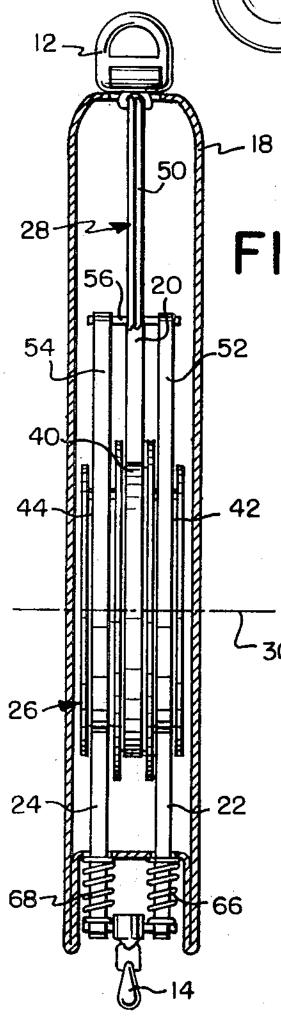
FIG. 3 is a rear elevation view of the isolator as shown in FIG. 1 with the external casing of the isolator cut away to show the dynamic components.
Figure 4:
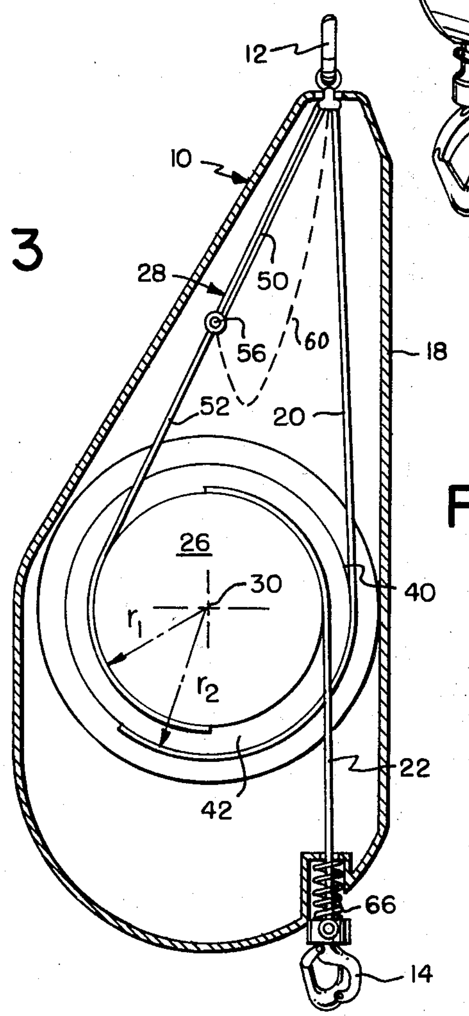
FIG. 4 is a side elevation view of the isolator as shown in FIG. 1 with the external casing cut away to show the dynamic components.

In FIGS. 3 and 4, the external casing 18 is cut away in order to reveal the principal dynamic components in this embodiment of the isolator. The dynamic components comprise an upper suspension cable 20 connected to the D-ring 12, two lower suspension cables 22 and 24 connected in parallel to the cargo hook 14, an inertial mass 26 to which each of the cables connects and a resilient tether 28 connected between the D-ring 12 and the inertial mass 26. The terms "upper" and "lower" are used for convenience only since the dynamic operation of the isolator is the same regardless of its orientation.

The inertial mass 26 is a body of revolution about a central axis 30 of symmetry and takes the form of a reel having multiple drum sections 40, 42 and 44 positioned in axially adjacent relationship along the axis 30. The drum sections are flanged and have cylindrical surfaces on which the suspension cables 20, 22 and 24 and tether 28 are wound. For the sake of clarity, the flanges of drum sections 40 and 42 are removed in FIG. 4 in order to show the drum surfaces and their respective radii, $r_2$ and $r_1$.

The upper suspension cable 20 is shown as a strap which, in addition to connecting to the D-ring 12, extends centrally between the cables 22 and 24 and tangentially onto the cylindrical surface of drum section 40 having the radius of curvature $r_2$. The cable 20 wraps around the cylindrical surface to an anchor point where a cable clamp or other suitable means fastens the end of the cable to the drum section 40.

The lower suspension cables 22 and 24 also take the form of straps which extend tangentially onto the cylindrical surfaces of the drum sections 42 and 44 respectively, each of which has a radius of curvature $r_1$. Both of the cables 22 and 24 wrap around the cylindrical surfaces in a direction about the axis 30 opposite to that of the cable 20 and are fastened respectively to the drum sections 42 and 44 by clamps in the same manner as cable 20.

By way of explanation, a reference to the direction in which a cable is wrapped around the mass 26 or axis 30 is determined for the purposes of this specification by tracing a cable from its free or loose end onto the cylindrical surfaces and around the mass. A statement to the effect that the cables are wound or wrapped in opposite directions about the mass means that the one cable is wound in a clockwise direction while the other cable is wound in a counterclockwise direction as traced from the free ends so that rotation of the mass in one direction about its axis causes reeling in of the free end of the one cable and reeling out of the free end of the other cable. It should also be noted from this definition that a single cable having its mid section wrapped around a reel so that there are two free ends is the equivalent of two separate cables each wrapped individually onto the mass.

The resilient tether 28 is a composite component having an elastic portion formed by a set of elastic chords 50 and a non-elastic portion formed by two straps 52 and 54 joined to the elastic chords 50 by means of a cross bar 56. The elastic chords 50 connect at their upper ends with the D-ring 12 which serves as a load-reaction point and the straps 52 and 54 extend tangentially onto the cylindrical surfaces of the drum sections 42 and 44 respectively. The straps 52 and 54 are anchored to the drums in the same manner as the cables 20, 22 and 24. The direction in which the straps 52 and 54 wrap about the central axis 30 is opposite that of the upper cable 20.

In order to render the isolator fail safe, a safety chain 60 is connected in parallel with the elastic chords 50 between the D-ring 12 and the cross bar 56. Also, to insure that the cables 20, 22 and 24 and the resilient tether 28 remain taut and, therefore, do not become fouled within the casing 18, antifouling springs 66 and 68 mounted coaxially about the cables 22 and 24 respectively are interposed between the cargo hook 14 and the casing 18. The lengths of the cables and the resilient tether are then selected or adjusted so that the cables are all under a small degree of tension when the unloaded cargo hook 14 is pulled against and slightly compresses the anti-fouling springs.

With the cable 20 extending tangentially onto the drum section 40 at a radius $r_2$ and the cables 22 and 24 extending tangentially onto the drum sections 42 and 44 at a radius $r_1$ as shown, a torque tending to rotate the mass 26 is generated whenever the cables are placed in tension by suspending a load from the cargo hook 14 while the D-ring 12 is connected to the aircraft. The static torque generated by the cargo load causes the mass 26 to rotate about its own central axis 30 and, at the same time, to translate or roll to a static position along the cables 20, 22 and 24 where an opposing torque produced by the stretching of the resilient tether 28 and reacted directly upon the D-ring 12 independently of the cables 20, 22 balances the torque produced by the suspended load. Since the cables 22 and 24 are wrapped onto the drum surfaces having a radius of curvature smaller than that of the drum surfaces on which the cable 20 is wrapped, a suspended load causes the mass 26 to rotate in the counterclockwise direction as viewed in FIG. 4 and to roll down the cable 20 until it reaches a static position at a point within the casing 18 lower than that shown.

Figure 5:
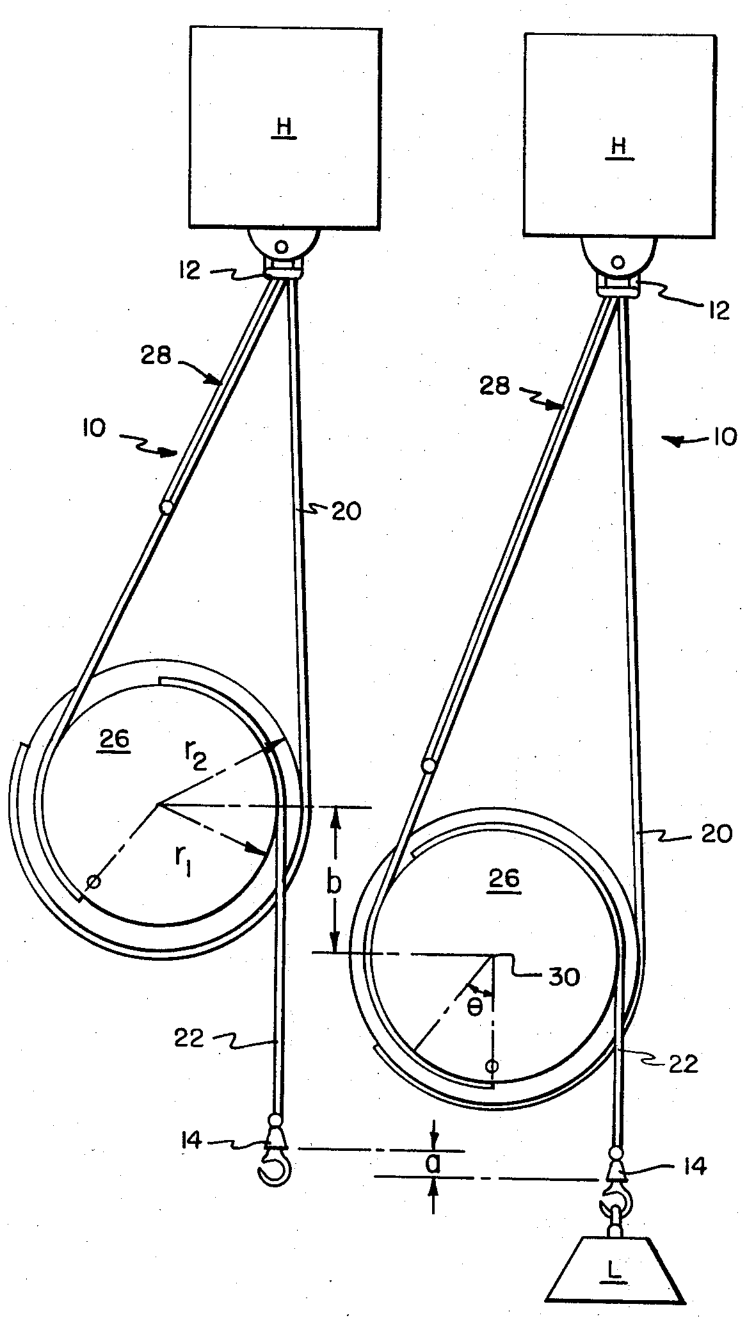
FIG. 5 shows the dynamic components of the isolator in simplified form and at two different operating positions.

FIG. 5 illustrates the displacement of mass 26 that is experienced when a load L is fastened to the cargo hook 14. The counterclockwise rotation by an amount $\theta$ causes a segment of the cable 20 equal in length to $r_2\theta$ to be unreeled from the drum section 40 while lengths of the cables 22 and 24 equal to $r_1\theta$ are reeled onto the drum sections 42 and 44 respectively. Consequently the center of the inertial mass 26 drops an amount b equal to $r_2\theta$ but the cargo load drops by an amount *a* equal to the differential in the cable lengths reeled in and out or $(r_2-r_1)\theta$.

When vibratory forces are transmitted through the isolator 10 due to excitation forces generated either within the aircraft or the suspended load, vibratory torques reacted through the tether 28 in basically the same manner as the static torques are imposed on the inertial mass 26 which cause it to both translate and rotate along the cables 20, 22 and 24 in an oscillatory manner about the static position. By appropriate design of the inertial mass 26 and the resilient tether 28, the isolator 10 can be tuned to prevent vertical bounce coupling at a given frequency, or in other words, an antiresonant condition is established. By selecting the given frequency to be equal to the dominant vertical excitation frequency originating from the helicopter rotor, vertical coupling instabilities are prevented. The isolator 10 achieves the antiresonance characteristics independently of the dynamic characteristics of the helicopter and the suspended load including the sling.

A simplified mathematical analysis of the dynamics of the isolator and interconnected helicopter and load system is obtained by writing the equations for the kinetic and potential energy of the system and using Lagrange's equation to obtain the steady state equations of motion. The vertical displacement transfer impedances through the isolator from the load to the helicopter and from the helicopter to the load are equal and are given by the partial derivatives:

$$\Delta Y_H/\Delta F_L = \Delta Y_L/\Delta F_H = \frac{K - \omega^2 M_{io}}{\omega^4 (M_{ii}M_{oo} - M_{io}^2) - \omega^2 K (M_{ii} + M_{oo} - 2M_{io})} \qquad 1$$

where $Y_H$ refers to the displacement of the helicopter
$Y_L$ refers to the displacement of the load
$F_H$ refers to the excitation forces of the helicopter
$F_L$ refers to the excitation forces, if any, of the load $M_{io} = 1/(r_2-r_1)^2(I+r_2r_1M_D)$
$M_{ii} = 1/(r_2-r_1)^2\ (I+r_1^2M_D) + M_L$
$M_{oo} = 1/(r_2-r_1)^2\ (I+r_2^2M_D) + M_H$
$K = k\ (r_2+r_1)^2/(r_2-r_1)^2$
$I$ = Mass moment of inertial of the mass 26 about the central axis 30
$M_D$ = Mass of the inertial mass 26
$k$ = Stiffness of the resilient tether 28
$M_L$ = Mass of load
$M_H$ = Mass of helicopter.

Since the transfer impedances are equal, the operation of the vibration absorber is the same regardless of whether the excitation forces originate in the body connected to the D-ring 12 or the cargo hook 14. It is, therefore, possible to connect the isolator 10 upside down between two bodies without affecting its operation.

It will be noted from equation 1 that the transfer impedance becomes zero at an antiresonant frequency given by the expression $$\omega_A^2 = K/M_{io} = k\ (r_2+r_1)^2/I+r_2r_1M_D. \qquad 2$$

It will be seen from the equation 2 that the antiresonant frequency is a fucntion of the dynamic components of the isolator alone and, therefore, even when the isolator is tuned to the fundamental excitation frequency of the helicopter, the antiresonant frequency is independent of the mass of the helicopter and load. More involved analysis shows such antiresonance is entirely independent of the external dynamics such as that which might be introduced by the slings supporting the suspended load.

The equation for resonance of the interconnected helicopter and load is obtained from the denominator of the equation 1 and can be shown to be $$\omega_R^2 = [k\ (r_2 + r_1)^2\ ]/I + M_D(r_2^2M_L + r_1^2M_H)/(M_D+M_L+M_H) + (r_2-r_1)^2(M_LM_H)/(M_L+M_H + M_D) \qquad (3)$$

A comparison of equations 2 and 3 shows that the system resonant frequency will always be lower than the antiresonant frequency and, therefore, the higher harmonics of the rotor excitation frequency can not induce resonance. Even though the resonant frequency is lower than the antiresonant frequency of the isolator, the possibility of matching the resonant frequency with the much lower pendular frequency of the system is virtually not existent for all practical aircraft load systems.

One example of the vibration isolator designed for use with a helicopter having a fundamental rotor excitation frequency 5.4 cps and capable of carrying a maximum sling load of 3,750 lbs. would be as follows: the mass 26 weighs 27.7 lbs. and is comprised of drum sections having radii corresponding to $r_1$ and $r_2$ of 5 and 6 inches respectively. With such a system the static deflection of the cargo load would be approximately one inch at maximum load.

Figure 6:
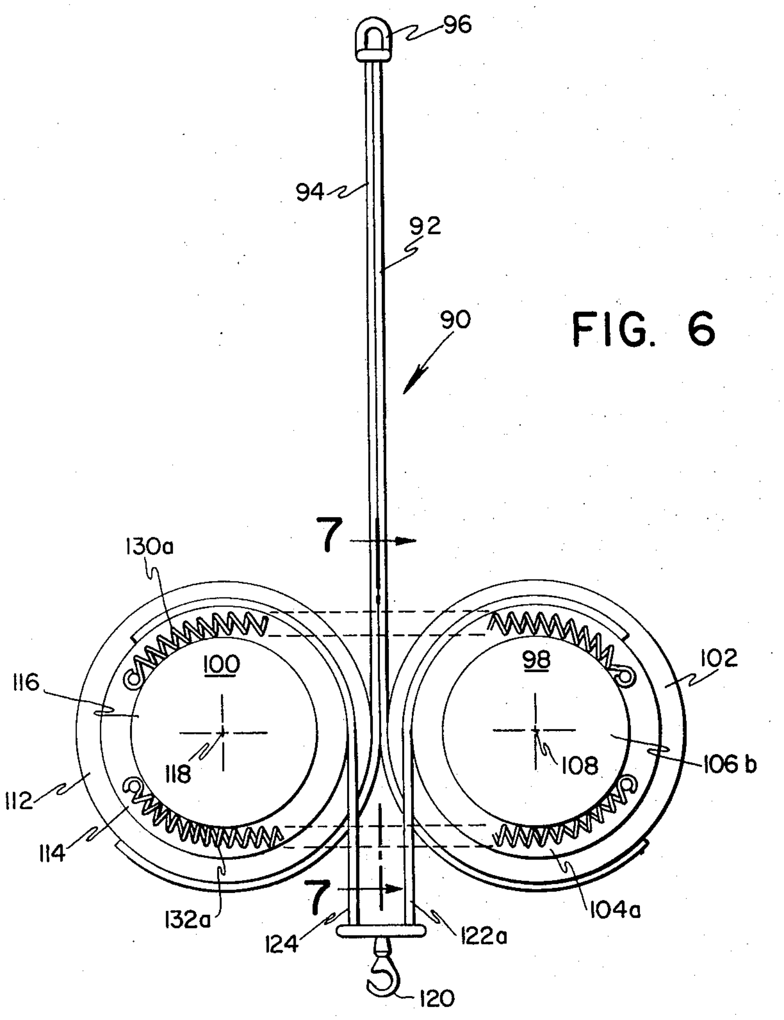
FIG. 6 shows the dynamic components of an alternate embodiment of the vibration isolator in simplified form.
Figure 7:
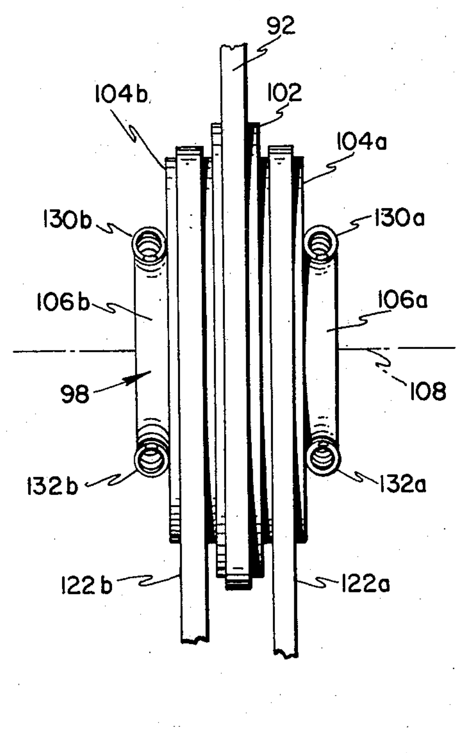
FIG. 7 is a fragmentary sectional view of the alternate embodiment as seen along the sectioning line 7—7 of FIG. 6.

Another embodiment of the vibration isolator of the present invention is shown in FIGS. 6 and 7. The isolator, generally designated 90, exhibits the same principles of antiresonance as the embodiment in FIGS. 1–5. The principal dynamic components of the isolator 90 are similar to those of the isolator 10 except that they are duplicated and the resilient tether has been replaced. In particular, a pair of upper suspension cables 92 and 94 are connected to the D-ring 96 and extend in parallel relationship respectively to rotatable inertial masses 98 and 100, each of which has multiple drum sections similar to the drum sections of the mass 26 in FIGS. 1–5. The mass 98 has a large-radius drum section 102, two intermediate-radius drum sections 104 (letter subscripts being used to distinguish the corresponding sections or parts) on opposite axial ends of the section 102 and two small-radius drum sections 106 mating with the exposed end faces of the respective sections 104. Each of the drum sections is coaxially positioned about a central axis 108 of the mass 98.

In a corresponding manner the inertial mass 100 has the same construction as the inertial mass 98 and includes the large-radius drum section 112, two intermediate-radius drum sections 114 (one not visible) and two small-radius drum sections 116 (one not visible), all positioned coaxially about the central axis 118.

The upper suspension cable 92 is wrapped around and connected to the drum section 102 and the cable 94 is wrapped around and connected to the drum section 112.

The inertial mass 98 is connected with the cargo hook 120 by means of a pair of suspension cables 122 and in a similar manner the mass 100 is connected with the cargo hook by a pair of cables 124 (one not visible). The cables 122 are wrapped respectively onto and connected to the two drum sections 104 and the cables 124 are wrapped respectively onto and connected to two drum sections 114. It will be noted that the cable 92 is wrapped around the mass 98 in a direction opposite to the pair of cables 122 and that the cable 94 is wrapped around the mass 100 in a direction opposite to the pair of cables 124. With the cables connected in this manner, the masses 98 and 100 are free to roll back and forth in side-by-side relationship along the respective cables so that the cables connected to the D-ring 96 are reeled in or out relative to the masses while the cables connected to the cargo hook 120 are reeled out or in respectively.

In order to counteract the static loads transmitted through the isolator 90 and to establish a static position of the masses along the cables, corresponding pairs of torquing springs 130 and 132 are stretched between load-reaction or anchor points on the masses 98 and 100 and extend tangentially from the cylindrical surfaces of the four drum sections 106 and 116. The pair of torquing springs 130 extends between the upper sides of the masses 98 and 100 and tends to rotate the masses in directions which reel the cables 92 and 94 onto the masses. The pair of springs 132 extends between the bottom sides of the masses 98 and 100 and tends to rotate the masses in a direction opposite that of the springs 130 so that the cables 122 and 124 connected to the cargo hook 120 are reeled in.

The combined operation of the torquing springs 130 and 132 establishes side-by-side static positions for the masses along the cables. When the isolator 90 is excited by vibratory forces, the torquing springs permit the masses to oscillate about the established static positions and react to the forces with a characteristic restoring spring rate completely independent of the cables and cable loads. In this respect, the torquing springs are similar to the resilient tether 28 in the embodiment of FIGS. 1–5. In addition, however, the torquing springs pull the masses 98 and 100 together with the axes 108 and 118 parallel and tend to prevent the cables from jumping off of the respective drum sections during high accelerations of the masses experienced at the antiresonant frequency. Also, since the torquing springs extend tangentially of the cylindrical surfaces of the drum sections 106 and 116, the restoring torques generated by the springs are not subject to a cosine effect which is experienced by the resilient tether 28 in FIGS. 1–5 mounted at an angle to the cable 20. Of course, the isolator 90 is tuned for antiresonance by appropriate design of both masses and both pairs of torquing springs.

It will thus be seen that the isolators of the present invention are passive isolators since they do not require external power and do not dissipate power. There are no feedback links which upon failure can cause a phase reversal and catastrophic destruction of the helicopter and cargo system. The antiresonant characteristic which produces the zero coupling impedance at a given frequency is determined solely by the components of the isolators themselves and therefore, is not effected by the dynamic characteristics of the interconnected bodies. Since all of the operational components of the isolators move in rolling contact with one another, wear and maintenance problems are at a minimum. No special servicing requirements as might be expected with hydraulic isolators are required of the mass-spring isolators illustrated. The disclosed isolators, therefore, once assembled, are prepared for lifetime operation with inherently fixed operating characteristics.

While the present invention has been described in several preferred embodiments, it should be understood that numerous modifications and substitutions can be had without departing from the spirit of the invention. The cables shown in the embodiment of FIGS. 6 and 7 can also assume the form of straps such as those shown in the embodiments of FIGS. 1–5. Other forms of cables may also be employed as desired. The cables may be wrapped completely around the drum sections or only partially as long as the wrapped portions are long enough to accommodate the static and dynamic displacements of the suspended load. The form the resilient member which determines the spring constant of the isolator may be derived in either embodiment from elastic members or mechanical springs. The particular geometry of the rotatable masses may also be varied and it is apparent from a comparison of the two embodiments disclosed that the number of cylindrical surfaces on the mass will depend upon the number of cables and resilient members and the manner in which they are connected to the mass. Accordingly, the present invention has been described in preferred embodiments by way of illustration rather than limitation.

I claim:

1. A vibration isolator for reducing the transmission of vibrations at a given frequency between a first body and a second body joined together by the isolator, comprising: an inertial mass bearing at least two cylindrical surfaces having different radii of curvature and positioned coaxially about an axis of the mass; first coupling means for connecting the vibration isolator to the first body; second coupling means for connecting the vibration isolator to the second body; first cable means having one end connected to the first coupling means and the other end wound at least partially around one of the two cylindrical surfaces and connected to the inertial mass whereby the inertial mass may roll about said axis and along the first cable means relative to the first coupling means; second cable means having one end connected to the second coupling means and its other end wound at least partially around the other of the two cylindrical surfaces and connected to the inertial mass whereby the inertial mass may roll about said axis and along the second cable means relative to the second coupling means; and resilient means connected between a load-reaction point and the inertial mass independently of the first and second cabling means for resiliently urging the inertial mass to roll toward a given position along each of the cable means between the first and the second coupling means.

2. A vibration isolator as defined in claim 1 wherein: the resilient means is connected between the inertial mass and the first coupling means for resiliently urging the mass to roll toward the first coupling means.

3. A vibration isolator as defined in claim 2 wherein: the resilient means comprises an elastic tether stretching between the first coupling means and the inertial mass.

4. A vibration isolator as defined in claim 3 wherein: the elastic tether has one end connected to the first coupling means and the other end wound at least partially around one of the cylindrical surfaces in a direction about the axis of the mass opposite to that of the first cable means.

5. A vibration isolator as defined in claim 1 wherein: the first cable means includes a cable wound onto the one of the two cylindrical surfaces in one direction about the axis of the mass; and the second cable means includes a cable wound onto the other of the two cylindrical surfaces in the direction opposite that of the cable of the first cable means.

6. A vibration isolator as defined in claim 5 wherein: the inertial mass has at least three cylindrical surfaces coaxially positioned about the axis of the mass, two of the cylindrical surfaces having the same radii of curvature and the third having a different radius of curvature and being interposed between the other two; and the one of the cable means includes two cables wound in the same direction onto the two respective cylindrical surfaces having the same radii of curvature and the other of the cabling means has the cable wound onto the third of the cylindrical surfaces in the opposite direction.

7. A vibration isolator as defined in claim 1 wherein: the inertial mass comprises a body of revolution about said axis of the mass and having axially adjacent sections of different radii.

8. A vibration isolator as defined in claim 1 wherein: a casing is provided and encloses the inertial mass; the second coupling means is positioned outside of the casing; the first cable means includes a cable wound in one direction on one of the two cylindrical surfaces and extending from the inertial mass to the first coupling means; and the second cable means includes a cable wound in the opposite direction on the other of the two cylindrical surfaces and extending from the inertial mass through the casing to the second coupling means.

9. A vibration isolator as defined in claim 8 wherein: an anti-fouling spring is interposed between the second coupling means and the casing to maintain tension on the cables of the first and second cable means connected to the inertial mass within the casing.

10. A vibration isolator as defined in claim 1 wherein: two inertial masses are provided, each having a cylindrical surface of a given larger radius from a central axis of the mass and a cylindrical surface of a given smaller radius from the central axis, the masses having side-by-side operating positions in which the axes are parallel; the first cabling means includes two cables connected to the first coupling means and extending in parallel relationship to ends of the cables wound respectively onto the two cylindrical surfaces of larger radius and in opposite directions about the parallel axes; and the second coupling means includes another two cables connected to the second coupling means and extending in parallel relationship to ends of the cables wound respectively onto the two cylindrical surfaces of smaller radius and in directions about the parallel axes respectively opposite the directions of the corresponding cables of the first cabling means wound onto the corresponding inertial mass.

11. A vibration isolator as defined in claim 10 wherein: the resilient means comprises two torquing springs connected to the two inertial masses and extending between the masses in parallel relationship with each other and a line between the central axes of the masses.

12. An antiresonant coupling for suspending a cargo load from a craft comprising: a rotatable reel having a central rotational axis and a plurality of drum sections positioned coaxially about the central axis in axially adjacent relationship; first cabling means for interconnecting the craft and the reel and wrapping tangentially onto a first of the plurality of drum sections; second cabling means for interconnecting the reel and the cargo load and wrapping tangentially onto a second of the plurality of drum sections with a radius of curvature at the point of tangency different from the radius at the point of tangency of the first cabling means, the first and second cabling means being wrapped about the central axis of the reel to permit the reel to roll along the two cabling means in either direction while reeling in one of the cabling means and simultaneously reeling out the other cabling means; and resilient means connected to the rotatable reel for restoring the reel to a static position along the two cabling means between the craft and the cargo load and reacting restoring forces applied to the reel independently of the cabling means.

13. An antiresonant coupling as defined in claim 12 wherein the resilient means comprises a resilient tether connected between the reel and the first cabling means adjacent the end of the cabling means connecting with the craft.

14. An antiresonant coupling as defined in claim 12 wherein: the resilient means comprises a resilient tether having one end wrapping tangentially onto one of the plurality of drum sections in a direction opposite that of the first cabling means.

15. An antiresonant coupling as defined in claim 14 wherein: the resilient tether and the first cabling means both connect between the craft and the reel in the operating position of the coupling.

* * * * *